United States Patent [19]

Sandvig

[11] Patent Number: 4,728,425
[45] Date of Patent: Mar. 1, 1988

[54] COFFEE FILTER AND ANNULAR RETAINER

[76] Inventor: Larry G. Sandvig, 6821 Russell Ave., S., Richfield, Minn. 55423

[21] Appl. No.: 912,994

[22] Filed: Sep. 26, 1986

[51] Int. Cl.[4] ............................................... B01D 35/02
[52] U.S. Cl. .................................... 210/477; 210/479; 210/482; 99/295
[58] Field of Search ................ 210/473, 477, 478, 479, 210/481, 482; 99/279, 289 R, 292, 295, 323

[56] References Cited

U.S. PATENT DOCUMENTS

| | | | |
|---|---|---|---|
| 425,374 | 4/1890 | Elliott | 210/479 |
| 526,331 | 9/1894 | Tobin | 210/478 |
| 1,322,378 | 11/1919 | Vaughan | 210/485 |
| 3,385,039 | 5/1968 | Burke et al. | 210/485 |
| 3,388,804 | 6/1968 | Hester | 210/477 |
| 4,075,105 | 2/1978 | Steiner et al. | 210/477 |
| 4,080,299 | 3/1978 | Bartolome | 99/323 |
| 4,271,024 | 6/1981 | Kawolics et al. | 210/481 |
| 4,656,932 | 4/1987 | Kopp | 210/474 |

FOREIGN PATENT DOCUMENTS

| | | | |
|---|---|---|---|
| 19992 | 5/1882 | Fed. Rep. of Germany | 210/479 |
| 589214 | 5/1925 | France | 210/477 |
| 655240 | 7/1951 | United Kingdom | 210/477 |

Primary Examiner—Richard V. Fisher
Assistant Examiner—Wanda L. Millard
Attorney, Agent, or Firm—Clayton R. Johnson

[57] ABSTRACT

There is disclosed filter apparatus for coffee makers wherein the the ground coffee is placed in a filter and hot water passes over the coffee grounds, through the filter and into the coffee pot. The filter apparatus includes a pleated paper filter that is placed in a basket to have the filter peripheral wall portion extend upwardly from the bottom of the basket and a retainer positionable for being surrounded by the filter peripheral wall portion to prevent the filter from collapsing and allowing coffee grounds flowing into the coffee pot with the filtrate.

10 Claims, 3 Drawing Figures

U.S. Patent    Mar. 1, 1988    4,728,425
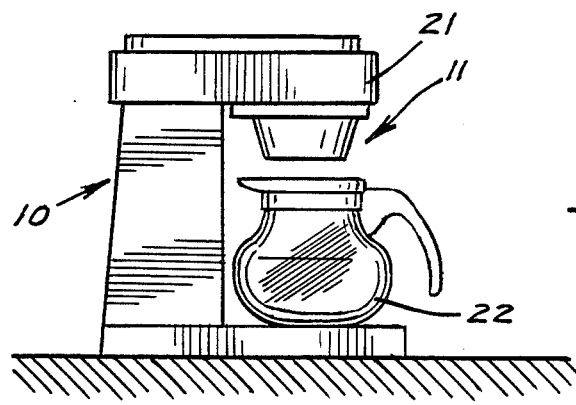
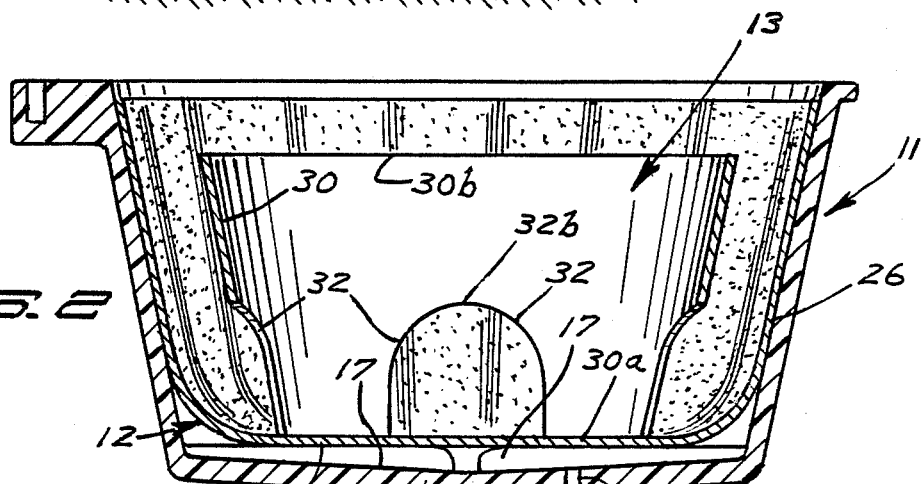
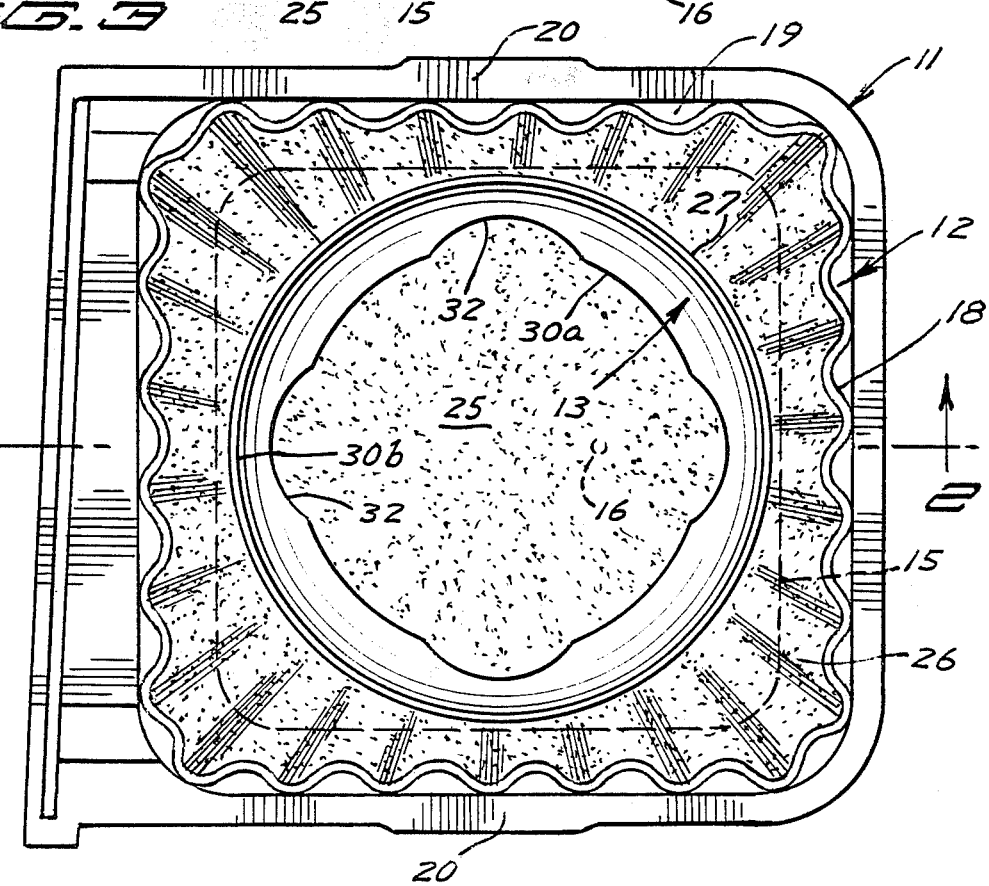

COFFEE FILTER AND ANNULAR RETAINER

BACKGROUND OF THE INVENTION

Filter apparatus usable in brewing beverages such as coffee and tea.

In U.S. Pat. No. 425,374 to Elliott there is disclosed a filter support made of wire that is coiled to at least in part be of a conical or cylindrical shape and is positionable in a filter to prevent the filter from collapsing. Each of U.S. Pat. Nos. 1,322,378 to Vaughan and 3,385,039 to Burke et al disclose structure positionable within a filter that would prevent collapse of the filter.

In order to provide new and novel apparatus to prevent the collapse of a paper filter during the process of making beverages such as coffee and tea, this invention has been made.

SUMMARY OF THE INVENTION

Filter apparatus that includes a paper filter which during a filtering operation has an upwardly extending peripheral wall, a basket for supportingly holding the filter, including preventing portions of the peripheral wall from moving outwardly away from other filter wall portions, and an annnular annular retainer for limiting movement of such wall portions inwardly toward one another sufficiently to allow solid materials flowing over the filter and into the container for the filtrate, and having spaced openings to permit passage of liquid from within the confines of the retainer to the exterior of the retainer.

BRIEF DESCRIPTION OF THE DRAWINGS

FIG. 1 is side view of a conventional coffee maker that includes the coffee filter apparatus of this invention;

FIG. 2 is a vertical cross sectional view of the filter apparatus of this invention, said view being generally taken along the lineand in the direction of the arrows 2—2 of FIG. 3; and FIG. 3 is a plan view of the apparatus shown in FIG. 2.

In FIG. 1 there is shown a conventional coffee maker, generally designated 10, for example one sold under the trademark "Mr. Coffee" that is utilizing the filter apparatus of this invention, generally designated F. The filter apparatus F includes a basket, generally designated 11, that is of a conventional construction for the coffee maker shown. The basket includes a bottom wall 15 that is properly sloped for drainage of liquid through the drainage opening 16, a plurality of ribs 17 integrally joined to the bottom wall to extend thereabove while not blocking liquid flow to the drainage hole and upwardly and outwardly extending side and end walls 18 and 19 respectively that are integrally joined to the bottom wall 15 and to one another for retaining liquid, other than for passage through the drain hole 16. The basket includes opposite top flange portion 20 to dependingly support the remainder of the basket from the overhanging part 21 of the coffee maker in a position the drain hole will drain into the coffee pot 22 as is conventional.

Within the basket there is positioned a pleated paper filter, generally designated 12, which has fold line 27 to define a circular bottom wall 25 and a peripheral upwardly extending pleated wall 26 that at its lower edge is integrally joined to the bottom wall at fold line 27. Wall 26, when outside of the basket, is generally frusto conical and has its minor base edge joined to wall 25. Preferably the diameter of wall 25 is slightly less than the minimum dimensions between walls 18, 18 and walls 19, 19.

The retainer, generally designated 13, comprises a generally frusto conical annular wall 30 that in use has an annular minor base edge 30a abutting against the top surface of the filter bottom wall and an annular major base top edge 30b that advantageously extends to a lower elevation than the top edges of walls 18, 19 and the filter top edge. A plurality of circumferentially spaced cut outs or openings 32 are provided in wall 31 that advantageously open downwardly through edge 30a. Although the cut outs may be of shapes other than that shown, each cut out shown is defined by vertical, generally parallel wall edge portions 32a that extend upwardly and are joined by a downwardly opening, arcuately curved edge portion 32b. Other than for openings 32, the retainer wall 30 is unperforated. Advantageously the surface area of the inner surface of the unperforated part of the retainer wall 30 is several times greater than the total area of the openings 32. As may be seen in FIG. 2, the basket and filter extend to a higher elevation than the retainer.

The diameter of the fold line 27 is greater than the outer diameter of edge 30a, but preferably less than twice as great. As may be seen from the drawings the inner peripheral dimension of the basket at the juncture of its bottom wall to its perimetric wall is substantially greater than the maximum peripheral dimension of the top edge of the retainer. Further the retainer is of shape that the retainer may be placed in the basket and filter to have its entire vertical outer peripheral surface out of contact with the filter peimetric wall, and in the plane of the tope edge is spaced from the basket perimetric wall by a dimension that is many time greater than the thickness of the filter perimetric wall in the same direction. The angle of taper of wall 30 from the vertical in an upward and outward direction advantageously is in the neighborhood of about 2°-10°.

In use the basket is removed from the part of the coffee maker that supports the basket during use, if not already removed, and a pleated paper filter is placed in the basket to have the filter bottom wall supported by the ribs and the wall 26 abut against the walls 18, 19. Now the retainer 13 is placed within the filter to have edge 30a abut against the filter bottom wall top surface and thence the ground coffee or other solid material over which liquid is to flow to dissolve portions (flavor components) of the solid material that is placed in the filter. It is noted the ground coffee could be placed in the filter before the retainer, however that is less satisfactory. The retainer is of a height and its top annular edge is of a diameter such that even if the filter peripheral wall should collapse inwardly, it still would leave a large enough opening for pouring ground coffee to be located within the confines of the retainer and permit the discharge of water into the basket to pass through the coffee grounds without first impinging on part of the filter wall 26. Also the retainer is of height greater than the maximum level to which the liquid (water) will raise during the filtering operation so that during the filtering procedure water will not flow over filter wall portion 26, but rather will have to pass through wall portion 26 or wall portion 25 before it can flow to the drainage opening. In the event any opening is provided in the retainer wall that opens upwardly through the top annular edge of the retainer, such opening does not extend downwardly below the elevation to which liquid will rise during the filter operation.

After the ground coffee has been placed in the filter, the basket with the ground coffee, filter and retainer therein is replaced on the part of the coffee maker that supports the basket during the coffee brewing operation. Thence water is discharged downwardly into the space surrounded by the retainer and can flow through the cut outs to the annular space between filter wall 26 and the retainer to the drainage opening or directly through the filter bottom wall to the drainage opening. With reference thereto the heights of the cut outs is somewhat greater than the maximum depth of ground coffee when the coffee maker is used for making the maximum amount of brewed coffee.

What is claimed is:

1. Filter apparatus for containing coffee grounds from which favoring components are separated by liquid and permitting the discharge of liquid with dissolved flavoring components while blocking the passage of ground coffee with the dissolved flavoring components, comprising a basket for receiving liquid therein and having a bottom wall and a perimetric wall joined to the basket bottom wall to extend thereabove, the basket bottom wall having at least one liquid discharge opening, a paper filter in the basket for containing coffee grounds while permitting the passage of liquid with dissolved flavor components therethrough, said filter having a bottom wall supported by the basket bottom wall and a perimetric wall portion joined to the filter bottom wall to extend thereabove and upwardly along the basket perimetric wall, and an annular retainer within the basket to limit collapsing movement of the filter perimetric wall portion, said retainer being surrounded by the filter perimetric wall portion and having a bottom edge, an inner peripherial surface, a top edge, and means defining a plurality of openings adjacent to the retainer bottom edge for permitting liquid flow to and from within the confines of the retainer, the retainer having a non-perforated, vertically extending wall portion that has the inner surface and is of an area substantially greater than the area of said openings, the retainer bottom edge being adjacent to the filter bottom wall and supported by the filter bottom wall, the retainer top edge extending to a higher elevation than the basket bottom wall and the maximum level that the liquid rises to in the basket, the filter bottom wall being located vertically between the retainer bottom edge and the basket bottom wall and said retainer being removable from the basket separate from the filter to leave the filter bottom wall in contact with the basket bottom wall.

2. The apparatus of claim 1 further characterized in that at least one of said openings opens through the retainer bottom edge.

3. The apparatus of claim 1 further characterized in that the retainer and basket each extend to a higher elevation than the filter.

4. The apparatus of claim 1 further characterized in that the filter perimetric wall is pleated.

5. Filter apparatus for containing a solid material from which flavoring components are separated by water and permitting the discharge of liquid with dissolved flavoring components while blocking the passage of solid material with the dissolved components and used for preparing a beverage, comprising, a basket for receiving liquid therein and having a bottom wall and a perimetric wall joined to the basket bottom wall to extend thereabove, the basket bottom wall having at least one liquid discharge opening, a paper filter in the basket for containing solid material while permitting the passage of liquid with dissolved flavor components therethrough, said filter having a bottom wall supported by the basket bottom wall and a perimetric wall portion joined to the filter bottom to extend thereabove and upwardly along the basket perimetric wall, and an annular retainer surrounded by the filter perimetric wall and having a bottom edge adjacent to and abutting against the filter bottom wall and a plurality of openings that open through the retainer bottom edge for permitting liquid flow to and from within the confines of the retainer, the retainer being non-perforated other than for the openings that open through the bottom edge and having its bottom edge vertically on the opposite side of the filter bottom wall from the basket bottom wall and being removable from the basket separate from the filter to leave the filter supportingly retained by the basket.

6. The filter apparatus of claim 5 further characterized in that the filter peripheral wall is pleated and that the retainer extends to a higher elevation than the maximum level that liquid rises to in the basket.

7. The filter apparatus of claim 5 further characterized in that the retainer is frusto conical and has a top edge that is of a greater peripheral dimension than the peripheral dimension of the retainer bottom edge and is smaller than the maximum inner peripheral dimension of the basket bottom wall.

8. The filter apparatus of claim 1 further characterized in that the retainer has a top edge that is of a minimum horizontal spacing from the basket perimentric wall by a dimension many times greater than the corresponding thickness of the filter and that the filter extends to a higher elevation than the retainer top edge.

9. The filter apparatus of claim 1 further characterized in that the basket at the juncture of the perimetric wall to the basket bottom wall is of an internal peripheral dimension that is greater than the maximum peripheral dimension of the retainer top edge.

10. The filter apparatus of claim 9 further characterized in that the basket has a top edge and that the basket perimetric wall comprises side and end walls that extend upwardly and outwardly from the basket bottom wall.

* * * * *